(12) United States Patent
Pralus

(10) Patent No.: US 8,367,989 B2
(45) Date of Patent: Feb. 5, 2013

(54) REMOVABLE LID FOR COOKING OR HEATING FOOD IN A MICROWAVE OVEN

(75) Inventor: Georges Pralus, Briennon (FR)

(73) Assignee: George Pralus, Briennon (FR)

( * ) Notice: Subject to any disclaimer, the term of this patent is extended or adjusted under 35 U.S.C. 154(b) by 433 days.

(21) Appl. No.: 12/602,598

(22) PCT Filed: May 26, 2008

(86) PCT No.: PCT/EP2008/056402
§ 371 (c)(1),
(2), (4) Date: Apr. 16, 2010

(87) PCT Pub. No.: WO2008/145624
PCT Pub. Date: Dec. 4, 2008

(65) Prior Publication Data
US 2010/0200574 A1    Aug. 12, 2010

(30) Foreign Application Priority Data
Jun. 1, 2007   (FR) ..................................... 07 55417

(51) Int. Cl.
*H05B 6/80*   (2006.01)
(52) U.S. Cl. ......... 219/734; 219/682; 219/731; 219/735
(58) Field of Classification Search .................. 219/734, 219/682, 731, 735
See application file for complete search history.

(56) References Cited

U.S. PATENT DOCUMENTS

| 5,132,151 | A | 7/1992 | Graney |
| 2002/0041920 | A1 | 4/2002 | Fernandez |
| 2004/0251257 | A1 | 12/2004 | Schultz et al. |

FOREIGN PATENT DOCUMENTS

| EP | 0334772 | 9/1989 |
| EP | 1234534 | 8/2002 |
| EP | 1464262 | 10/2004 |
| JP | 2005350120 | * 12/2005 |
| JP | 2006-326042 | * 12/2006 |
| JP | 2008-279141 | * 11/2008 |

* cited by examiner

*Primary Examiner* — A. Sefer
(74) *Attorney, Agent, or Firm* — Occhiuti Rohlicek & Tsao LLP

(57) ABSTRACT

The invention relates to a removable lid for defining a food cooking or heating enclosure (5) in a microwave oven, comprising an outer wall (2) pervious to microwaves and sealed for air and steam, an inner wall (3) pervious for microwaves and adapted for the passage of air and steam, and an intermediate ply (4) made of a porous water-retaining material and provided between the inner and outer walls, characterised in that the outer wall (2) includes at its inner face oriented towards the inner wall (3) at least one convex conformation (10) for defining a cold condensation area, the inner wall (3) being open opposite each convex conformation in order to expose at least the portion of the intermediate ply (4) surrounding the convex conformation (10).

15 Claims, 3 Drawing Sheets

REMOVABLE LID FOR COOKING OR HEATING FOOD IN A MICROWAVE OVEN

CROSS-REFERENCE TO RELATED APPLICATIONS

This application is the National Stage of International Application No. PCT/EP2008/056402, filed on May 26, 2008, which claims the benefit of French Application No. 0755417, filed on Jun. 1, 2007. The contents of both of the foregoing applications are hereby incorporated by reference in their entirety.

The present invention pertains to the technical field of utensils or accessories used for cooking or heating food in a microwave oven.

For cooking or heating food in a microwave oven, a patent document EP 0334772 has proposed to implement a removable bell that has an external wall pervious to microwaves and is airtight and steamtight, an internal perforated wall and finally an intercalary sheet made out of porous, water-retentive material and placed between the internal and external walls. The removable bell is designed to be placed, after humidification of the intercalary sheet, on a plate or dish containing the food to be heated so as to define a heating enclosure. Thus, when the oven is in operation, the microwaves heat the water contained in the intercalary sheet which turns into steam and gets diffused through the perforations of the internal wall in the heating enclosure, contributing to the heating of the food and preventing it from drying.

Such a removable clock is generally satisfactory and can in most cases be used to ensure cooking or heating of food by microwaves without loss of moisture or drying of the food. However, it has emerged that, in certain configurations of use and especially when heating food that requires above-average application times, the prior art bell cannot always ensure the presence of steam throughout the heating.

The need has therefore appeared for a new type of removable lid for the formation of a heating enclosure within a microwave oven that is capable of ensuring the presence of steam for the complete duration of the heating or at the very least during the major part of this heating and, in any case, for a duration greater than the one obtained with the prior art bell.

In order to attain this goal, the invention pertains to a removable lid for the formation of an enclosure for cooking or heating food within a microwave oven, comprising:
  an external wall pervious to microwaves and airtight as well as steamtight,
  an internal wall pervious to microwaves and adapted to allowing the passage of air and steam,
  an intercalary sheet made out of a porous, water-retentive material placed between the internal and external walls,
wherein:
  the external wall has, on its internal face oriented towards the internal wall, at least one convex conformation designed to define a cold condensation area,
  the internal wall is open before each convex conformation so as to expose at least one part of the intercalary sheet enveloping the convex conformation.

Very advantageously, the opening of the internal wall before each convex conformation enables a part of the steam present inside the enclosure to get condensed on the internal surface of each convex conformation of the external wall. The liquid water thus formed re-humidifies the intercalary sheet and gets diffused by capillarity within this sheet and is turned into steam again. This regeneration enables the lid of the invention to maintain a presence of steam within the enclosure which it defines again for the entire duration of application of the microwaves.

According to one characteristic of the invention aimed at facilitating the handling of the lid, the external wall, at its internal face, possesses at least one or two convex conformations which define concave conformations, at the external face, that are adapted to a grasping of the lid by means of the fingers.

According to the invention, the opening of the internal wall at the convex conformations can be done in any appropriate way. According to one embodiment of the invention the internal wall has at least one window facing one or more convex conformations of the external wall.

According to the invention, the internal wall can be made in any appropriate way to the extent that it provides for the diffusion of steam and microwaves within the cooking or heating enclosure. In one preferred embodiment that is not strictly necessary for achieving the invention, the internal wall is made out of a material pervious to microwaves and airtight and steamtight and possesses a series of perforations designed to let air and steam pass through.

In the case of this preferred embodiment of the invention and according to one characteristic of the invention, the internal wall of the removable lid has an upper part or top bordered by a peripheral edge, the perforations designed to let air and steam pass through being made in the peripheral edge while the top is solid or closed except at the level of each window facing at least one convex conformation of the external wall. This characteristic ensures perfect distribution of steam within the heating enclosure by peripheral diffusion.

According to another characteristic of the invention aimed at optimizing re-humidification performance, the convex conformation or conformations are situated in an upper region of the lid.

According to yet another characteristic of the invention, the internal wall is fixed removably to the external wall. This advantageous characteristic permits better access to the intercalary sheet so as to ensure its initial humidification or its cleaning.

According to yet another characteristic of the invention, the intercalary sheet has antibacterial and antifungal properties preventing especially the proliferation of bacteria and the appearance of mould in the intercalary sheet.

The lid of the invention can be implemented in different ways. Thus, in one alternative embodiment, the removable lid comprises means for matching with a recipient in order to define, with this recipient, the food cooking or heating enclosure within a microwave oven.

In the same sense and according to another alternative embodiment, the removable lid of the invention has a bell-shaped conformation adapted to defining, with a support such as a microwave dish or tray, the food cooking or heating enclosure within a microwave oven.

Naturally, the different characteristics of the invention referred to here above can be implemented together with one another in different combinations when they are not incompatible or when they do not exclude one another.

Furthermore, various other characteristics of the invention shall emerge from the following description made with reference to the appended drawings, which show embodiments of the objects of the invention by way of non-exhaustive examples.

Figure 1:
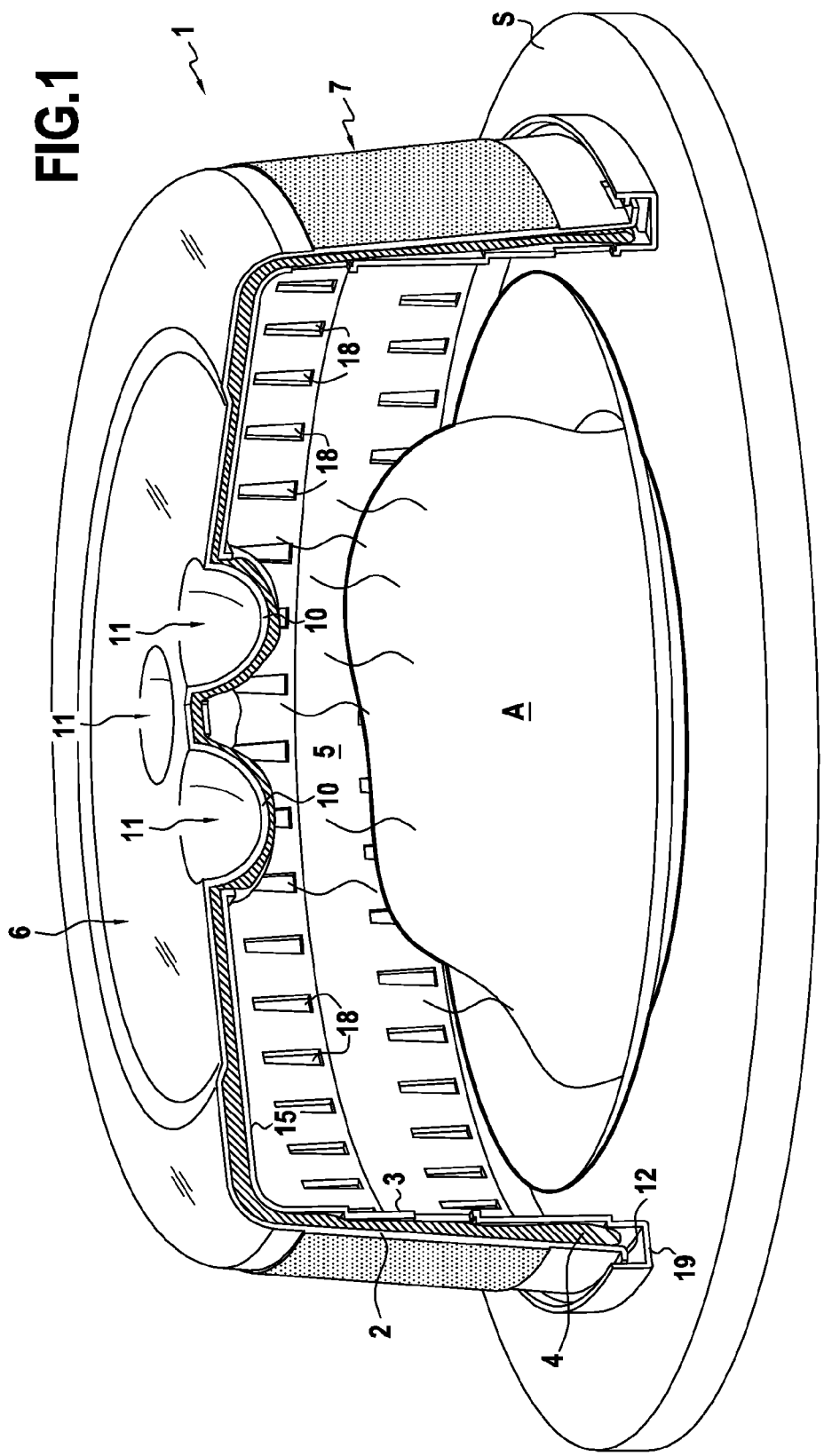
FIG. 1 is a partially cut-away perspective view of a removable lid according to the invention made in the form of a bell designed to be placed on a support.
Figure 2:
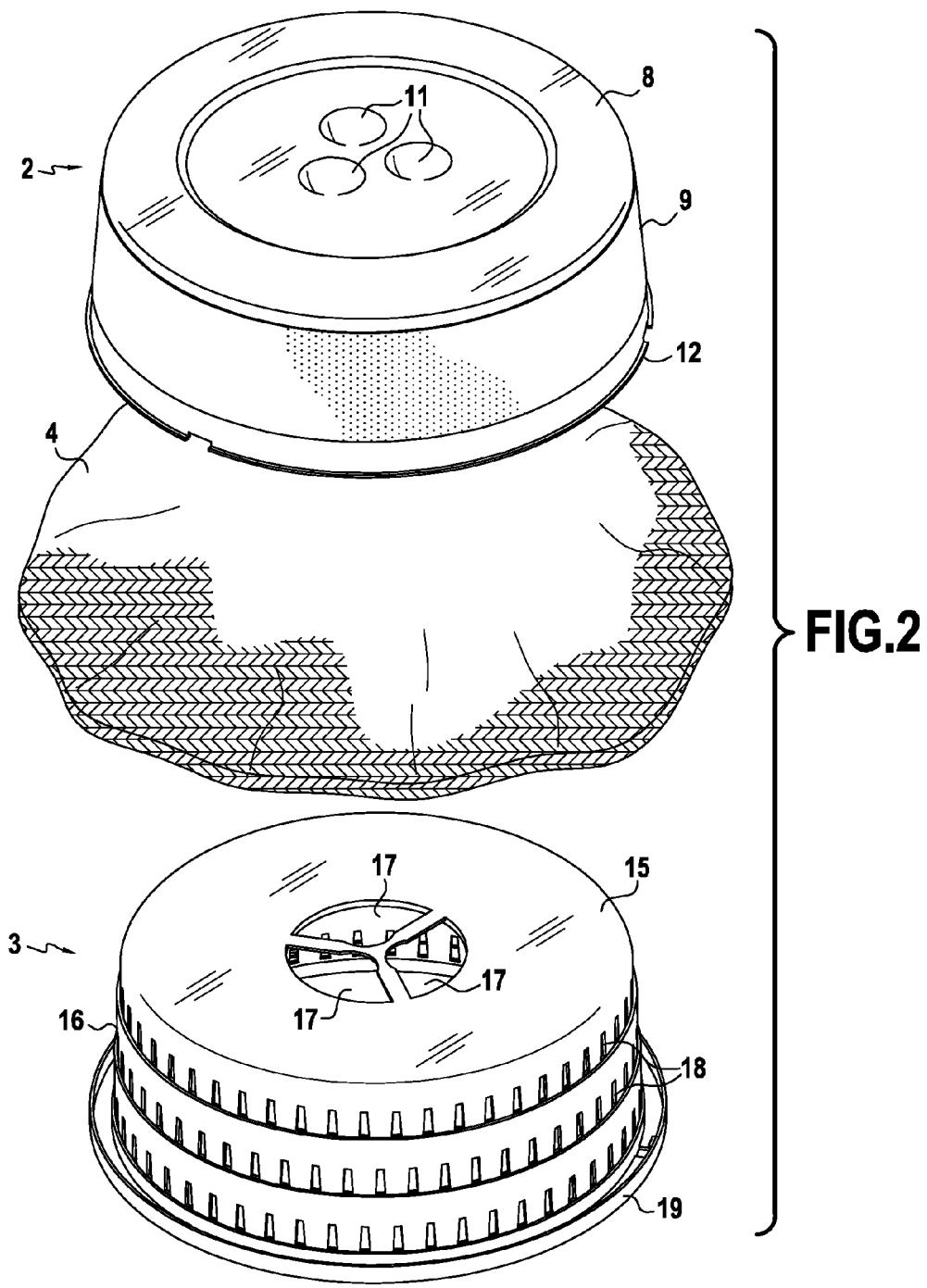
FIG. 2 is an exploded view showing the different constituent elements of the removable lid illustrated in FIG. 1.

A removable lid according to the invention designated in its totality by the reference 1 comprises, as can be seen in FIGS. 1 and 2, an external wall 2, an internal wall 3 and an intercalary sheet 4 interposed between the internal wall 3 and external wall 2.

According to the example illustrated, the removable lid 1 is made in the form of a bell designed to define a heating or confinement enclosure 5 when it rests on a support S such as, for example, the tray of a microwave oven as can be seen in FIG. 1. The removable lid 1 has a top 6 which is substantially flat, bordered by a peripheral edge 7 with a slightly conical truncated shape.

A conformation of this kind is repeated for the external wall 2 which therefore has a substantially flat top 8 bordered by a slightly conical truncated peripheral edge 9 converging towards the top 8. According to an essential characteristic of the invention, the external wall, on its internal face, has at least one convex conformation and, according to the example illustrated, three convex conformations 10 extending into the interior of the confinement enclosure 5. Again according to the example illustrated, these convex conformations are made at the top 8 and, at the external face of the internal wall 2, they define three concave conformations 11 laid out at 120° relative to one another and adapted to making it possible to grasp the removable lid 1 with three fingers. The peripheral edge 9 of the external wall 2 furthermore has a shoulder 12, opposite the top 8, for assembly with the internal wall 3. The external wall 2 is made of material pervious or transparent to microwaves and airtight and steamtight, for example a translucent plastic material such as polyethylene or polypropylene.

The bell-shaped conformation of the removable lid 1 is repeated for the internal wall 3 which has a substantially flat top 15 bordered by a peripheral edge 16 with a generally conical truncated shape converging towards the top 15. According to an essential characteristic of the invention, the internal wall 3 is open with respect to the convex conformations 10 and, in the example illustrated, comprises three windows 17 designed to be located so as to be facing the convex conformations 10. In the example illustrated, outside the window 17, the top 15 of the internal wall 3 is solid and has no other aperture. The external wall 3 is preferably made out of a material that is pervious or transparent to microwaves, airtight and steamtight, and is of the same nature as the constituent material of the external wall 2. In order to enable the diffusion of steam as shall be seen here below, the peripheral edge 16 of the internal wall 3 has a series of perforations 18 unevenly distributed throughout its perimeter. The peripheral edge 16 of the internal wall 3 also has, opposite the top 15, a peripheral rim 19 for assembly with the external wall 2.

The internal wall 3 and external wall 2 are adapted so as to create a space for receiving the intercalary sheet 4 when they are assembled. The intercalary sheet 4 then occupies the major part of this space by overlapping the convex conformations 10, the internal face of the intercalary sheet 4 being then open because of the existence of the windows 17. The intercalary sheet 4 can be made out of any appropriate material having water-retentive capacity and porosity sufficient to enable diffusion of steam, through the action of microwaves, from a quantity of water held by the intercalary sheet 4. Examples that may be cited of porous materials constituting the intercalary sheet are foams, fiber materials, paper type materials, textiles, especially cloth, knitted fabrics and nonwovens. In a preferred embodiment, the intercalary sheet 4 is made out of a fibrous material containing cellulose fibers or comprising exclusively cellulose fibers, these cellulose fibers being possibly chosen from among viscose, lyocell or cotton fibers. A material made of cellulose fibers of this kind has, in particular, a capillarity needed to enable the storage of a sufficient quantity of water which will then be spread under the effect of heating. In order to prevent any proliferation of bacteria outside periods when the removable lid 1 is being used, the intercalary sheet 4 has, in a preferred embodiment, antibacterial and antifungal properties. Naturally, the intercalary sheet will be chosen so as to be non-inflammable under microwaves and, advantageously, washable at temperatures of about 75° C.

The removable lid 1 thus constituted is implemented as follows.

First of all, the intercalary sheet 4 is moistened for example by having water poured on its part accessible through the windows 17 of the internal wall. The porosity of the intercalary sheet 4 then enables the water to spread within the sheet. And then, the removable lid 1 is placed inside the microwave oven (not shown) so as to cover all the foods to be heated which are then enclosed in the cooking or heating enclosure 5 as can be seen in FIG. 1.

Under the effect of the microwaves, the water contained in the intercalary sheet 4 turns into steam and spreads within the enclosure 5 through the perforations 8 of the internal wall 3. When the atmosphere of the enclosure 5 is saturated with steam, this steam gets condensed naturally at cold zones defined by the convex conformations 10, contributing to a re-moistening the intercalary wall 4 and preventing the excess steam from escaping out of the enclosure 5. The water retrieved at the convex conformations 10 spreads by capillarity within the intercalary sheet 4 and is then turned into steam again and spreads through the enclosure 5 through the perforations 18. Thus, the presence of the convex conformations 10 makes it possible to ensure firstly a regulation of the level of steam in the enclosure 5 and secondly a recycling of water so as to keep the intercalary sheet 4 moist, so that a humid atmosphere is sustained in the enclosure throughout the period of application of the microwaves.

According to the example illustrated, the internal wall 3 is fixed detachably to the external wall 2 so as to enable easy cleansing of the intercalary sheet 4 after use. However, it could be planned to have the internal wall 3 and external wall 2 joined to each other permanently so as to prevent or debar any dismantling.

According to the example described here above and illustrated in FIGS. 1 and 2, the removable lid 1 of the invention has a bell shape adapted to defining, along with an oven dish or tray, the cooking or heating enclosure. However, according to the invention, the removable lid 1 could be made in any other way.

Figure 3:
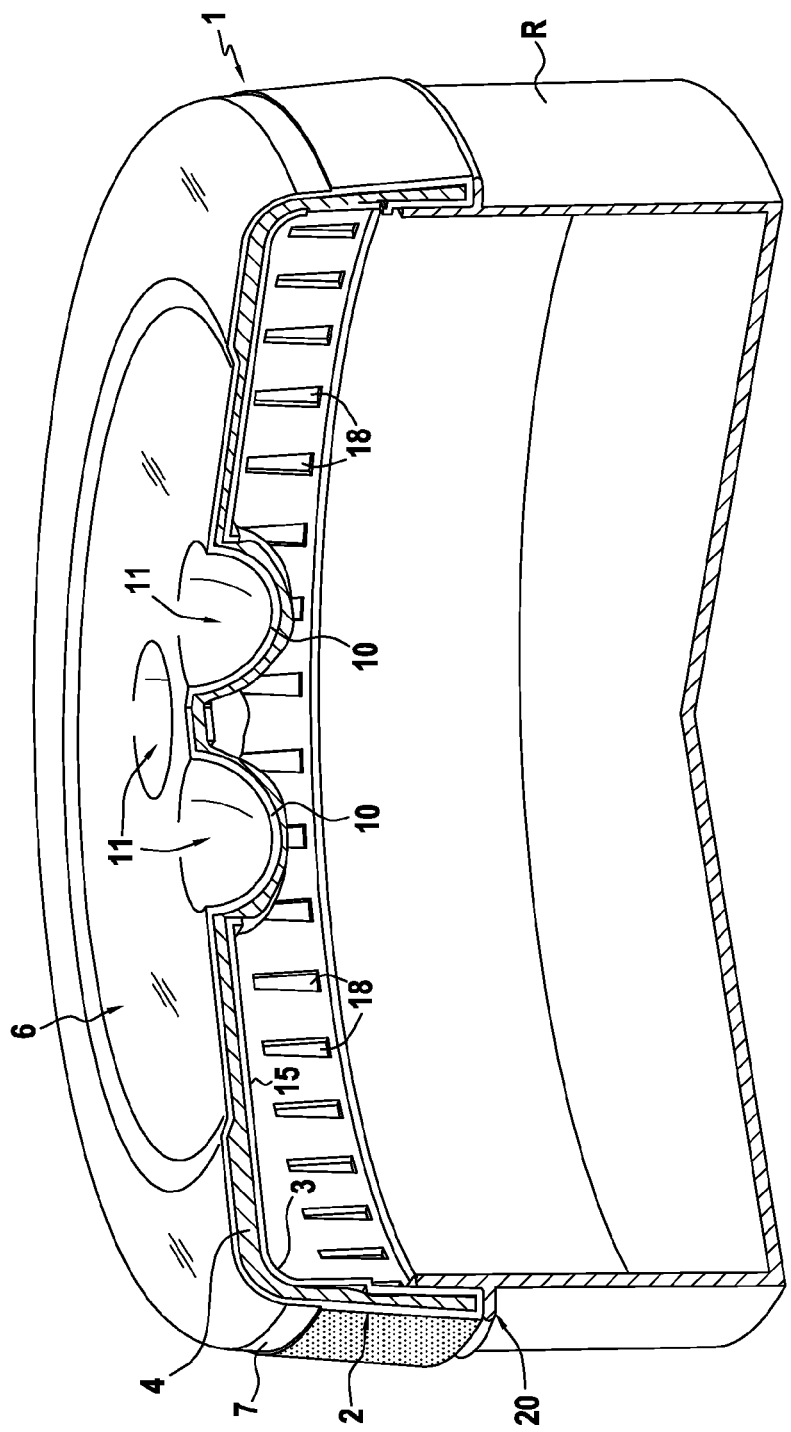
FIG. 3 is a partially cut-away perspective view similar to that of FIG. 1 showing another alternative embodiment in which the removable lid of the invention is designed to be matched with a recipient.

Thus, according to the example illustrated in FIG. 3, the removable lid is designed to be matched with a recipient R so that, with this recipient, it defines the enclosure 5 for cooking or heading food contained in the recipient R. To this end, the lower part of the peripheral edge 7 defines a means 20 for matching with the recipient R.

The following description provides a detailed description of the embodiments implementing an intercalary sheet with antibacterial and antifungal properties. Such a sheet could also be implemented in the prior art bells, especially those described in the patent EP 0334772. These antibacterial and antifungal properties could be obtained by treatment of the porous material with an antibacterial and antifungal compound. It is also possible to provide for the use of antibacterial and antifungal fibers which incorporate antibacterial and antifungal agents within the fibers, although this is not preferred. When the porous material is a textile, the treatment is preferably done on the fibers before the textile is made or preferably it is done on the finished textile.

The antibacterial and antifungal compound may be made up of a polymer binder in which an antibacterial and antifungal agent is dispersed. The quantity of antibacterial and antifungal agent is chosen so as to obtain the desired antibacterial and antifungal effect. The binder and the antibacterial and antifungal agent are chosen to be compatible with food applications. For example, the binder is chosen from among the acrylates, polyurethanes, formol-urea, polyvinyl acetates and their mixtures. The antibacterial and antifungal agent for its part could be an organic agent, for example chosen from among the quaternary ammonium compounds or an inorganic agent chosen from among silver or zinc salts, silver-based or zinc-based zeolites, zinc, silica, ceramics or glass powder containing silver or zinc. The antibacterial and antifungal agent may be in the form of particles dispersed in the binder or may be directly solubilized in the binder. Advantageously, the antibacterial and antifungal agent is selected so that it can withstand household washing jobs at temperatures in the range of 75° C.

The antibacterial and antifungal agents here below could be used in the context of the invention:
- Alphasan silver salt adsorbed on zirconium phosphate by the firm Miliken,
- Silver zeolite A by the Sinanen Company
- Silver and zinc zeolite by Ciba Specialty Chemicals
- Glass powder containing silver, magnesium and calcium by the Ihsizuka Glass Co, Ltd.

Preferably, the antibacterial and antifungal treatment or the antibacterial and antifungal fibers will be selected so as to be colored white or ecru. A particularly advantageous example of a treatment would be the bi-compound formulation Ultra-Fresh Silpure FBR-5 (Thomson Research Associates) made up of a silver salt (Silpure A) and an acrylate, approved by the FDA for food contact (Silpure B). The AEM 5772 (Aegis Microbe Shield) treatment provided by the firm Devan Chemicals NV (Renaix, Belgium) is also a treatment perfectly adapted to the invention. The AEM 5772 treatment comprises a trimethylsilane bearing a quaternary ammonium function with a chain in $C_{18}$ and a polyamine type Nanolink binder behaving like an activator of reagent sites.

The following three examples are examples of porous materials that can be used to make an intercalary sheet in the context of the invention.

EXAMPLE 1

A 14 g test-piece of cellulose nonwoven material (70% by mass of viscous fibers, 30% by mass of polyester fibers, 50 g/m2 produced by Jacob Holm) of 14 g is plunged into the mixture:
- 0.22 g of Silpure A
- 2.57 g of Silpure B
- 45.16 g of fresh water After washing and rinsing, the test-piece of nonwoven material is impregnated with a mass of liquid corresponding to 150% of its mass before dipping.

The percentages by mass of the impregnated nonwoven material are therefore:
0.69% by mass of Silpure A
7.79% by mass of Silpure B The test-piece of nonwoven material is dried under ventilation at ambient temperature and then heated (for the polymerizing of Silpure B) at 150° C. for 55 seconds in a stove.

Microbiological test on non-washed test-piece according to the ISO/DIS 20743 standard $\Delta=-4.75$ (0 UFC are counted in the test-piece after 24 hours)

With the treatment containing silver, the bacteria in the test-piece were destroyed within 24 hours. Strain: *Staphylococcus aureus*

Microbiological Test According to the ISO/DIS 20743 Standard

On test-piece washed five times according to NF EN 26 330 at 75° C. without perborate $\Delta=0$ (Strain: *Staphylococcus aureus*)

With the treatment containing silver, the bacteria population is kept constant for 24 hours. The fibers of the nonwoven material washed five times had bacteriostatic properties.

Control test-piece without treatment
$10^{4.74}$ UFC introduced at time 0
$10^{7.29}$ UFC recovered at 24 hours
$\Delta=+2.54$ Water adsorption test according to the ISO 9073-6 standard
A test-piece of nonwoven material with a mass M1 is plunged into fresh water and then drained. At the end of the draining (30 minutes), the mass of the impregnated test-piece is M2.

Expression of results
Computation of R in %=$100\times(M2-M1)/M1\%$
=$100\times$mass of retained water/mass of dry test-piece %
For the non-washed treated test-piece: R=700%
For the control test-piece without treatment: R=870%
For the test-piece treated and then washed five times according to NF EN 26 330 at 75° C. without perborate: R=800%

EXAMPLE 2

A test-piece of nonwoven cellulose material containing 100% viscose (produced by Texidel: ref MV 130 White 130 g/m2 de) with 80 g is treated with the mixture:
- 1.40 g of Silpure A
- 13.37 g of Silpure B
- 203.4 g of fresh water The test-pieces are sub-divided into 20 g sub-test-pieces and dried and heated for one minute 45 seconds at 160° C. with a steamer from the Mathis laboratory ref. DHE 58797 (steam free, hot air flow rate: 90%).

Adsorption test according to the ISO 9073-6 standard described here above
For the treated test-piece (washed or non-washed): R=720%
For the control test-piece: R=680%

EXAMPLE 3

A test-piece of nonwoven cellulose material containing 100% viscose (produced by Texidel: ref MV 130 White 130 g/m2 de) with 80 g is treated with the mixture:
- 40 g Silane AEM 5772/5 Aegis Microbe Shield
- 20 g AEM Nanolink (Devan additive)
- 940 g fresh water After dipping, the test-piece of nonwoven material is impregnated with a mass of liquid corresponding to 74% of its mass before dipping.

The percentages by mass for the impregnated nonwoven material are therefore:
2.96% in Silane
1.48% in Nanolink Drying is done at 130° C. in a stove ventilated for three minutes.

Microbiological test according to the ISO/DIS 20743 standard on an non-washed test-piece $\Delta=-1.68$: with the treatment, the bacteria population was reduced by 1.68 log in 24 hours. The fibers of the nonwoven material have bacteriostatic properties.

on test-piece washed five times at 60° C. without perborate $\Delta=0$: the bacteria population is constant over 24 hours.

The fibers of the nonwoven material washed five times have bacteriostatic properties. Strain: *Staphylococcus aureus*

Adsorption test according to the ISO 9073-6 standard described here above

For the non-washed, treated test-piece: R=550%

For the treated test-piece washed five times according to NF EN 26 330 at 75° C. without perborate: R=680%

For the control test-piece without treatment: R=680%

Naturally, various modifications can be made in the mobile lid according to the invention in the context of the claims.

The invention claimed is:

1. A removable lid for the formation of an enclosure for cooking or heating food within a microwave oven, comprising: an external wall pervious to microwaves and airtight as well as steamtight; an internal wall pervious to microwaves and adapted to allowing the passage of air and steam; an intercalary sheet made out of a porous, water-retentive material placed between the internal and external walls; wherein: the external wall has, on its internal face oriented towards the internal wall, at least one convex conformation designed to define a cold condensation area; and the internal wall is open before the at least one convex conformation so as to expose at least one part of the intercalary sheet enveloping the convex conformation.

2. The removable lid according to claim 1, wherein the external wall, at its internal face, possesses at least one or two convex conformations which define concave conformations, at the external face, that are adapted to a grasping of the lid by means of fingers.

3. The removable lid according to claim 1, wherein the internal wall possesses at least one window facing one or more convex conformations of the external wall.

4. The removable lid according to claim 3, wherein the internal wall has a top bordered by a peripheral edge, perforations designed to let air and steam pass through being made in the peripheral edge while the top is solid or closed except at the level of each window facing at least one convex conformation of the external wall.

5. The removable lid according to claim 1, wherein the internal wall is made out of a material pervious to microwaves and airtight and steamtight and possesses a series of perforations designed to let air and steam pass through.

6. The removable lid according to claim 1, wherein the convex conformation or conformations are situated in an upper region of the lid.

7. The removable lid according to claim 1, wherein the internal wall is fixed removably to the external wall.

8. The removable lid according to claim 1, wherein it comprises means for matching with a recipient in order to define, with this recipient, the food cooking or heating enclosure within a microwave oven.

9. The removable lid according to claim 1, wherein it possesses a bell-shaped conformation adapted to defining, with a support, the food cooking or heating enclosure within a microwave oven.

10. The removable lid according to claim 1, wherein the porous material of the intercalary sheet is a fibrous material.

11. The removable lid according to claim 10, wherein the fibrous material is based on or exclusively constituted by cellulose fibers.

12. The removable lid according to claim 1, wherein the porous material of the intercalary sheet has antibacterial and antifungal properties.

13. The removable lid according to claim 12, wherein the porous material is treated with an antibacterial and antifungal composition comprising an antibacterial and antifungal agent dispersed in a polymer binder.

14. The removable lid according to claim 13, wherein the binder is chosen from the acrylates, polyurethanes, formol-urea, polyvinyl acetates and their mixtures.

15. The removable lid according to claim 13, wherein the antibacterial and antifungal agent is an organic antibacterial and antifungal agent chosen from among the quaternary ammonium compounds or an inorganic antibacterial and antifungal agent chosen from among silver or zinc salts, silver-based or zinc-based zeolites, zinc, silica, ceramics or glass powder containing silver or zinc.

\* \* \* \* \*